Oct. 26, 1954     A. G. ASAFF     2,692,973

OHMMETER

Filed June 27, 1950

Inventor,
Annis G. Asaff
by Kenway, Jenney, Witter & Hildreth
Attys.

Patented Oct. 26, 1954

2,692,973

UNITED STATES PATENT OFFICE 2,692,973

OHMMETER

Annis G. Asaff, Auburndale, Mass., assignor to Callaghan Hession Corporation, Boston, Mass., a corporation of Massachusetts Application June 27, 1950, Serial No. 170,671

2 Claims. (Cl. 324—62)

This invention relates to a precautionary safety device for indicating the capacity of persons to accumulate electrostatic charges by measuring their individual electrical resistance while in contact with a conductive flooring. In particular it comprises a meter adapted to measure the electrical resistance between a person and ground quickly, conveniently and with a minimum of interference with his occupational routine.

It is often necessary for persons to work under conditions where explosive concentrations of combustible material are likely to accumulate in the atmosphere. A dangerous condition results when such persons accumulate electrostatic charges, because the spark caused by the discharge of such charges is likely to initiate an explosion. It is, therefore, common and desirable to maintain a path of low resistance between the person and ground in order that electrostatic charges which are generated will be dissipated by a flow of current to ground. Hospital operating rooms, where there is often the danger of explosions from the vapors of certain modern anaesthetics, particularly cyclopropane, are frequently provided with semi-conductive flooring material and attempts are made to keep personnel and equipment in substantial electrical contact with this flooring. The effectiveness of such precautionary measures cannot be known, however, unless an actual indication or measurement of the resistance between a person and ground be made. Doctors and other hospital personnel, for instance, may pick up a layer of wax on the soles of their shoes that prevents electrical contact from being made with the conductive flooring.

The indication or measurement of the resistance between a person and ground should be made under actual working conditions in order to determine his tendency then and there to accumulate a charge, and minimize the effect of intervening events which may interfere with the conductive path. It should also be done quickly and conveniently so as not to interfere materially with his working routine, as experience shows that if the measurement is too involved the personnel will become indifferent to it. And in the case of hospital operating room personnel, the measurement must be made without contaminating their surgically clean hands. The measuring device should also be accessible to all persons, regardless of physical stature, so that only one device need be provided in each locality.

The principal object of this invention is to provide an instrument for measuring the resistance between a person and ground under actual working conditions with an absolute minimum of interference with his working routine, accessible to all, and without requiring manual contact.

This invention is essentially a meter having a dial calibrated to read resistance. It is well known that an ohmmeter must utilize a source of electromotive force since the measurement is essentially one of determining the voltage drop and current ratio. One embodiment of this invention utilizes the 110/120 volt utility system, supplemented by a transformer and rectified, as the source of electromotive force. One feature of this embodiment of the invention is that it provides an instrument which draws power only when a measurement is being made, the making of measuring contact turning the power "on" and the breaking of measuring contact turning it "off."

The National Fire Protection Association has set an upper limit of 500,000 ohms resistance between the person and ground as safely preventing the accumulation of dangerous charges of electrostatic electricity. This invention comprises an ohmmeter adapted to measure resistances of the order of magnitude of 500,000 ohms, one measuring terminal of which is grounded or otherwise electrically connected to the common potential level of the working area. The other terminal is connected to a conductive arm which projects from the meter in such a manner as to be readily accessible to non-critical regions of the body, as for instance, the elbow. This arm may be adapted to be moved slightly by the pressure exerted against it and connected with a switch in the main power circuit to the meter. Pressure against the arm, made for taking the measurement of one's resistance to ground, displaces the arm and closes the switch thereby turning the meter on only during the period of the measurement.

These features and other advantages will be best understood from the following description of a preferred embodiment of this invention, selected for illustrative purposes and not by way of limitation, and from the accompanying drawings whereto reference is made in which.

Figure 1:
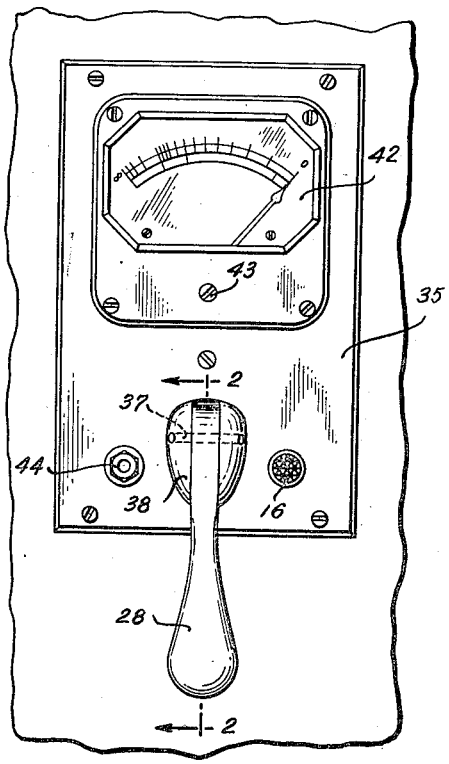
Fig. 1 is a front view of the meter mounted on a wall.

The ohmmeter is one of conventional direct reading design as shown in Fig. 1. Power from an ordinary 110/120 volt source is supplied to the terminals 10 and 11, terminal 10 being the line ground. The line from terminal 11 connects with a fuse 12 and then with switch 13 which is normally open. The circuit is completed through primary windings 14 of an electrostatically shielded transformer 15 giving a secondary voltage of 90 volts. A lamp 16 is placed in parallel with the primary windings 14 and serves to indicate when power is being supplied to the meter. The secondary windings 17 of transformer 15 are part of a rectifier circuit comprising in series the secondary windings 17, a 50-ohm resistor 18, a (selenium) rectifier 19 and a 50 microfarad filter condenser 20 which is shunted by a 1 megohm resistor 21. The negative side of the rectifier circuit is connected through a 250,000 ohm current limiting resistor 22 to the ground terminal 23 of the meter. This connection is made through the terminals of a jack 29.

The positive side 24 of the rectifier supplies an electromotive force of about 90 volts to the ohmmeter circuit. The National Fire Protection Association requires that resistance measurements such as these be made at potential of from 90 to 500 volts, and at currents of less than 10 milliamps, alternatively the power supply can consist of any source of D. C. voltage of from 90 to 500 volts in series with a resistance calculated to limit the current to less than 10 milliamps. The high resistance of the source of potential simulates electrostatic voltage conditions in that the high voltages are accompanied by low currents, rendering it safe to apply the measuring voltage of from 90 to 500 volts across a human body.

The ohmmeter circuit comprises a microammeter 26a having a range of about 400 microamperes and an armature resistance of 65 ohms, which is paralleled by the series circuit comprising a variable 2000 ohm resistor 26 and a 200 ohm resistor 25. The range of the microammeter ultimately depends on the measuring voltage and resistance of the circuit. The microammeter 26a is calibrated to read directly in ohms. The unknown resistance of one's body to ground is connected in series with the ohmmeter circuit through the lead 27 which is connected with a downwardly projecting conductive arm 28. Body contact is made with this arm thereby completing the circuit by connecting, through the body resistance to ground, the conductive arm 28 with the ground terminal 23.

A jack 29 is provided for testing purposes having an integral normally open switch 30. The collar and tip connections of the jack connect respectively to ground and the measuring terminal. The switch connections parallel the connections of switch 13. Insertion of a plug connected with known resistances, turns the meter on and provides a convenient way of calibrating and testing the resistance between any point on the floor and ground.

For most applications of this invention the ground 23 will be an earth ground, such as is obtained by connecting the terminal to a rod driven well into the earth or to a cold water main. In some applications however true ground potential may have no significance, as when the entire working area in which the ohmmeter is installed is insulated from ground. In such cases terminal 11 should be connected with an object which is itself at the common potential level, as e. g. all conductive objects with which personnel may come in contact.

Figure 2:
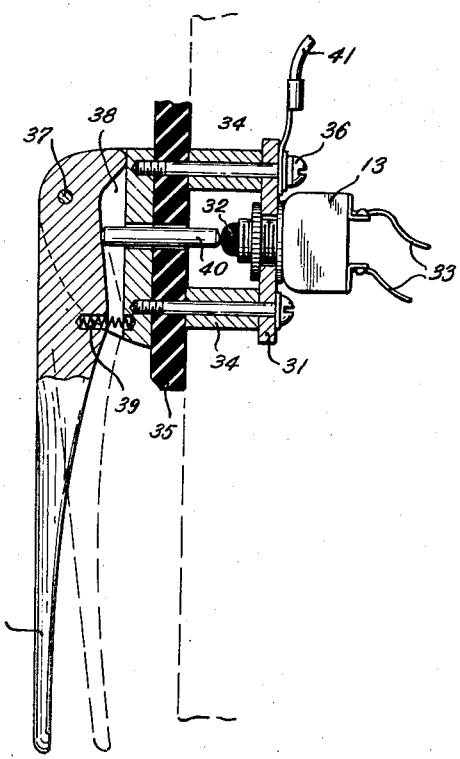
Fig. 2 is a cross sectional view showing the conductor arm and switch.

When a rectified A. C. source of voltage is used, one embodiment of this invention provides the switch 13 for turning the power "on" and "off" which is actuated by the making of measuring contact with the conductive arm 28. This feature, as well as the details of the conductive arm, are shown in Fig. 2. Switch 13 is mounted on a platform 31 having an aperture through which the push button 32 of switch protrudes. The leads 33—33 of the switch connect with the fuse 12 and primary 14 of transformer 15 shown in Fig. 1. Platform 31 is mounted on sleeves 34 which rest against the rear side of the face plate 35. The screws 36 secure the platform 31 and switch 13 in their proper functional relationships. The conductor arm 28 is fastened pivotally by means of pin 37 to a base 38 of electrically conductive material having a recessed portion adapted to receive the upper end of the arm. A spring 39 yieldingly holds the arm 28 outwardly away from the base 39. The base with the accompanying arm 28 is held to the face plate 35 by means of the screws 36. The base and arm 28 as thus mounted oppose the switch 13 and its push button 32. A rod 40 extends through a hole in the face plate 35 and through a hole in the base 38. One end is in contact with the arm 28 and the other end engages the push button 32 of the switch. Depression of the arm 28 causes it to rock slightly about the pivot 37 and push the rod 40 and the push button 32, thereby turning the meter "on." Breaking contact permits the spring 39 to urge the arm 28 back to its normal position, and a spring (not shown) in the switch returns the push button 32 and rod 40 to their normal positions, breaking the circuit.

The conductive arm 28 is electrically incorporated in the ohmmeter circuit through the lead 41 which is held under the head of one of the screws 36. This screw electrically connects the lead 41 with the base 38 and conductive arm 28 with which the base is in contact.

Figure 3:
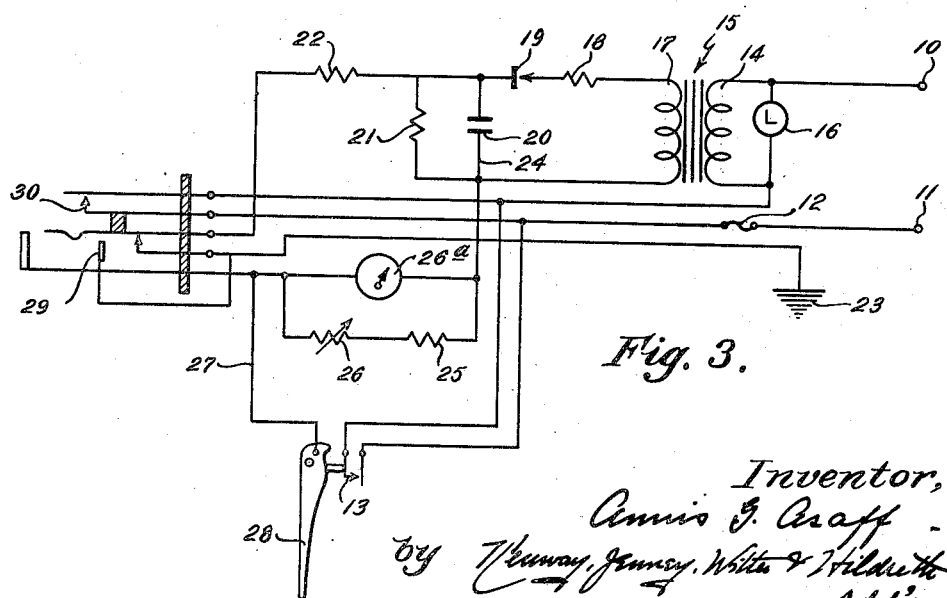
Fig. 3 is the diagram of the circuit used in the ohmmeter.

The meter is mounted for operation as shown in Fig. 3, conveniently on a wall with the conductive arm 28 extending downward. The dial 42 of the meter is conveniently placed just above the conductive arm 28 so that a person can read his own resistance measurement. Conveniently the scale of the dial 42 can be provided with a color code. For instance that portion of the dial indicating less than 500,000 ohms can be green, indicating that the resistance of the person being measured is within safe limits. That portion from 1,000,000 ohms to 500,000 ohms can be orange, indicating that the resistance is questionable, and that portion indicating resistances greater than 1,000,000 can be red, indicating that the resistance is dangerously high. A control screw 43 of the variable resistor 26 shown in Fig. 1 protrudes through the panel 35 to be readily accessible for calibration. A jack 44 and the indicating light 16, both shown in Fig. 1, are also mounted on the face plate 35.

It will be understood that the ohmmeter is usually mounted on the wall of an operating room at a height convenient to be reached by the bared elbow of a nurse or doctor so that, in approaching the operating table, he or she may depress the arm 28 and get an instantaneous indication from the meter as to the degree of insulation or resistance to the discharge of static charge. With this arrangement it is not necessary for the person to contact a sterilized glove with the meter in order to get the desired indication. Moreover since the meter may be mounted above the four foot level it is not subject to the vapor-proof requirements of the underwriter.

It will be understood that three test circuits may be utilized in employing the ohmmeter above described: (1) body to flooring using the switch arm 28, (2) any point from floor to ground using the jack 44, or (3) any two points in the flooring using the jack and a second electrode.

Having thus disclosed my invention and described in detail an illustrative embodiment thereof, I claim as new and desire to secure by Letters Patent:

1. An ohmmeter for measuring the resistance between a person standing on a conductive flooring and ground, including a terminal for a rectifier circuit having connection with a source of A. C. voltage and a normally open switch in said circuit adapted to interrupt the flow of alternating current to the rectifier, an ohmmeter circuit in series with said rectifier circuit, said ohmmeter circuit including a resistance-indicating meter and terminals for connection across the unknown resistance, one terminal being grounded and the other connected with a downwardly protruding arm of conducting material, adapted to make electrical contact with bare regions of the body without manual contact, pivotally mounted at its upper end and yieldingly held in a normally vertical position subject to angular displacement about its pivot by linear force, said arm communicating mechanically with said switch whereby displacement of the conductive arm closes the switch.

2. An ohmmeter for measuring the resistance between a person standing on a conductive flooring and ground, including a terminal for a rectifier circuit having connection with a source of A. C. voltage and a normally open switch in said circuit adapted to interrupt the flow of alternating current to the rectifier, an ohmmeter circuit in series with said rectifier circuit, said ohmmeter circuit including a resistance-indicating meter and terminals for connection across the unknown resistance, one terminal being grounded and the other connected with a downwardly protruding arm of conductive material, adapted to make electrical contact with bare regions of the body without manual contact, pivotally mounted at its upper end and yieldingly held in a normally vertical position subject to angular displacement about its pivot by linear force, said arm communicating mechanically with said switch whereby displacement of the conductive arm closes the switch, and said ohmmeter circuit including jack connections for changing the circuit ground to another conductive object.

References Cited in the file of this patent

UNITED STATES PATENTS

| Number | Name | Date |
|---|---|---|
| 629,022 | Wolinski | July 18, 1899 |
| 786,533 | Sutton et al. | Apr. 4, 1905 |
| 1,088,780 | Katz | Mar. 3, 1914 |
| 1,593,024 | Macadie | July 20, 1926 |
| 1,593,029 | Pagliarul | July 20, 1926 |
| 1,593,638 | Moyer | July 27, 1926 |
| 1,764,410 | Legg | June 17, 1930 |
| 2,157,973 | Wenger | May 9, 1939 |
| 2,556,458 | Webster | June 12, 1951 |